US011504770B2

(12) United States Patent
Hildreth et al.

(10) Patent No.: US 11,504,770 B2
(45) Date of Patent: Nov. 22, 2022

(54) DISSOLVING METAL SUPPORTS IN 3D PRINTED METALS AND CERAMICS USING SENSITIZATION (71) Applicants: ARIZONA BOARD OF REGENTS ON BEHALF OF ARIZONA STATE UNIVERSITY, Scottsdale, AZ (US); THE PENN STATE RESEARCH FOUNDATION, University Park, PA (US)

(72) Inventors: Owen Hildreth, Tempe, AZ (US); David Wright, Mesa, AZ (US); Abdalla Nassar, State College, PA (US); Tim Simpson, State College, PA (US); Christopher Lefky, Tempe, AZ (US)

(73) Assignees: ARIZONA BOARD OF REGENTS ON BEHALF OF ARIZONA STATE UNIVERSITY, Scottsdale, AZ (US); THE PENN STATE RESEARCH FOUNDATION, University Park (PA)

( * ) Notice: Subject to any disclaimer, the term of this patent is extended or adjusted under 35 U.S.C. 154(b) by 945 days.

(21) Appl. No.: 16/317,725

(22) PCT Filed: Feb. 16, 2017

(86) PCT No.: PCT/US2017/018104
§ 371 (c)(1),
(2) Date: Jan. 14, 2019

(87) PCT Pub. No.: WO2018/013178
PCT Pub. Date: Jan. 18, 2018

(65) Prior Publication Data
US 2019/0314895 A1 Oct. 17, 2019

Related U.S. Application Data (60) Provisional application No. 62/400,464, filed on Sep. 27, 2016, provisional application No. 62/363,034, filed on Jul. 15, 2016.

(51) Int. Cl.
B22F 10/20 (2021.01)
B22F 3/24 (2006.01)
(Continued)

(52) U.S. Cl.
CPC ............... *B22F 10/20* (2021.01); *B22F 3/24* (2013.01); *B22F 10/62* (2021.01); *B33Y 40/20* (2020.01);
(Continued)

(58) Field of Classification Search
CPC .......... B22F 10/20; B22F 10/62; B22F 10/66; B22F 2999/00; B22F 10/40; B22F 3/24;
(Continued)

(56) References Cited

U.S. PATENT DOCUMENTS 3,011,920 A 12/1961 Shipley, Jr.
3,762,981 A 10/1973 Blank
(Continued)

FOREIGN PATENT DOCUMENTS

EP 0655317 A1 5/1995
EP 0697282 B1 2/1996
(Continued)

OTHER PUBLICATIONS

Roll, Daryl L., Passivation and the Passive Layer, Astro Pak, Jul. 2014 (Year: 2014).*
(Continued)

Primary Examiner — Brian D Walck
Assistant Examiner — Danielle Carda
(74) Attorney, Agent, or Firm — Michael Best & Friedrich LLP (57) ABSTRACT Systems and methods are disclosed for fabricating a metal or ceramic component using a 3D printer. An entire 3D printed piece, including both the metal or ceramic component and one or more support structures, is created of a first metal or
(Continued)

ceramic material. A sensitization layer is applied to all or part of the 3D printed piece to chemically alter portions of the first metal or ceramic material near the surface making those portions of the material more sensitive to the etching process. The etching process causes the affected material to deplete and separates the component from the support structures without requiring mechanical machining.

20 Claims, 3 Drawing Sheets

(51) Int. Cl.
| | |
|---|---|
| C25F 3/00 | (2006.01) |
| C25F 3/06 | (2006.01) |
| C25F 3/08 | (2006.01) |
| B22F 10/62 | (2021.01) |
| B33Y 10/00 | (2015.01) |
| B33Y 40/00 | (2020.01) |
| B33Y 70/00 | (2020.01) |
| B22F 10/66 | (2021.01) |
| B33Y 40/20 | (2020.01) |

(52) U.S. Cl.
CPC ............... *B33Y 70/00* (2014.12); *C25F 3/00* (2013.01); *C25F 3/06* (2013.01); *C25F 3/08* (2013.01); *B22F 10/66* (2021.01); *B22F 2999/00* (2013.01); *B33Y 10/00* (2014.12)

(58) Field of Classification Search
CPC ..... C25F 3/00; C25F 3/06; C25F 3/08; B33Y 10/00; B33Y 40/00; B33Y 40/20; B33Y 70/00; B33Y 40/10; B23P 6/007; Y02P 10/25
USPC .......................................................... 419/1
See application file for complete search history.

(56) References Cited

U.S. PATENT DOCUMENTS

| | | | |
|---|---|---|---|
| 4,420,459 | A | 12/1983 | Mizuhara |
| 5,121,329 | A | 6/1992 | Crump |
| 5,268,088 | A | 12/1993 | Okabayashi |
| 5,342,501 | A | 8/1994 | Okabayashi |
| 5,464,707 | A | 11/1995 | Moulton et al. |
| 5,621,449 | A | 4/1997 | Leenders et al. |
| 6,165,406 | A | 12/2000 | Jang et al. |
| 7,319,528 | B2 | 1/2008 | Hidaka |
| 8,043,535 | B2 | 10/2011 | Kamikoriyama et al. |
| 8,470,231 | B1 | 6/2013 | Dikovsky et al. |
| 8,813,651 | B1 | 8/2014 | Hooke |
| 10,286,713 | B2 | 5/2019 | Hildreth et al. |
| 10,288,638 | B2 | 5/2019 | Hildreth et al. |
| 2003/0128249 | A1 | 7/2003 | Booth |
| 2003/0199162 | A1 | 10/2003 | Seki |
| 2003/0230549 | A1 | 12/2003 | Buchanan et al. |
| 2004/0005258 | A1 | 1/2004 | Fonash et al. |
| 2006/0130700 | A1 | 6/2006 | Reinartz |
| 2010/0021638 | A1 | 1/2010 | Varanka et al. |
| 2011/0035848 | A1 | 2/2011 | Perkins et al. |
| 2011/0036802 | A1 | 2/2011 | Ronsin et al. |
| 2011/0111138 | A1 | 5/2011 | McCullough et al. |
| 2011/0256416 | A1 | 10/2011 | Brancher et al. |
| 2012/0193841 | A1 | 8/2012 | Wang et al. |
| 2013/0075957 | A1 | 3/2013 | Swanson et al. |
| 2013/0126465 | A1 | 5/2013 | Hu et al. |
| 2014/0202595 | A1 | 7/2014 | Hofmann |
| 2014/0257549 | A1 | 9/2014 | Swartz et al. |
| 2015/0004325 | A1 | 1/2015 | Walker et al. |
| 2015/0035209 | A1 | 2/2015 | Shah et al. |
| 2015/0037597 | A1 | 2/2015 | Kim et al. |
| 2015/0056319 | A1 | 2/2015 | Din et al. |
| 2015/0197862 | A1 | 7/2015 | Engel |
| 2016/0107234 | A1 | 4/2016 | Craeghs et al. |
| 2016/0199201 | A1 | 7/2016 | Weiss et al. |
| 2017/0146560 | A1 | 5/2017 | Hildreth et al. |
| 2017/0197371 | A1 | 7/2017 | Fetfatsidis et al. |
| 2018/0099520 | A1 | 4/2018 | Hildreth et al. |
| 2019/0039137 | A1 | 2/2019 | Hildreth et al. |
| 2021/0170493 | A1* | 6/2021 | Hildreth ................. B22F 10/64 |

FOREIGN PATENT DOCUMENTS

| | | |
|---|---|---|
| KR | 100359103 B1 | 11/2002 |
| WO | 2012041522 A1 | 4/2012 |
| WO | 2012131481 A1 | 10/2012 |
| WO | 2012162805 A1 | 12/2012 |
| WO | 2014197790 A1 | 12/2014 |

OTHER PUBLICATIONS

European Patent Office Extended Search Report for Application No. 17828087.1 dated Feb. 10, 2020 (8 pages).
European Patent Office Examination Report for Application No. 17753793.3 dated May 28, 2020 (7 pages).
Aberle et al., "Series Resistance of Solar Cells," in Photovoltaic Specialist Conference, 1993., IEEE, 1993, pp. 133-139.
Ambrose et al., "Thermodynamic properties of organic oxygen compounds Part IX. The critical properties and vapour pressures, above five atmospheres, of six aliphatic alcohols ," J.Chem.Soc., 3614-3625 (1963).
An et al., "High-Resolution Printing of 3D Structure Using an Electrohydrodynamic Inkjet with Multiple Functional Inks," Jun. 19, 2015, Adv. Mater. 2015, 27, 4322-4328, Wiley-VCH.
Bidoki et al., "Ink-Jet Fabrication of Electronic Components." J. Micromech. Microeng. 2007, 17, 967-974.
Chien et al., "Metallization optimization for high efficiency silicon heterojunction solar cells using low-temperature paste screen printing," 39th IEEE Photovoltaics Spec. Conf., 2013.
Cunningham et al., "Measurement of the correlation between the specular reflectance and surface roughness of Ag films," Phys. Rev. B, vol. 14, No. 2, pp. 479-483, Jul. 1976.
Dai et al., "Corrosion behavior of selective laser melted Ti-6Al-4V alloy in NaCl solution," Corrosion Science. 102 (2016) 484-489. doi:10.1016/j.corsci.2015.10.041.
De Minjer et al., "The Nucleation with SnCl[Sub 2]-PdCl[Sub 2] Solutions of Glass Before Electroless Plating." J Electrochem Soc 1973, 120, 1644.
De Wolf et al., "High-efficiency Silicon Heterojunction Solar Cells: A Review," vol. 2, pp. 7-24, 2012.
De Wolf et al., "Nature of doped a-Si:H/c-Siinterface recombination," J. Appl. Phys., vol. 105, 2009.
Deakin et al., "De-alloying of type 316 stainless steel in hot, concentrated sodium hydroxide solution," Corrosion Science. 46 (2004) 2117-2133. doi:10.1016/j.corsci.2004.01.011.
Demaurex et al., "Damage at hydrogenated amorphous/crystalline silicon interfaces by indium tin oxide overlayer sputtering," Appl. Phys. Lett., vol. 101, No. 17, p. 171604, 2012.
Deng et al., "Copper carboxylate with different carbon chain lengths as metal-organic decomposition ink," J. Mater. Sci.: Mater. Electron. 25, 390-397 (2013).
Dillon et al., "Fundamental Equation for Calculation of the Thermodynamic Properties of Ethanol," International Journal of Thermophysics, vol. 25, No. 2, 2004, 32.
Domonoky, BonsiBrain, Support—Full Disclosure, Httpifeelbeta. Deindex.Phpsupportsupport-Full-Disclosure. (2010). http://ifeelbeta.de/index.php/support/support-full-disclosure (accessed Feb. 2, 2016).
Epstein et al., "Cathodic corrosion of stainless steel in nitric acid," Corrosion Science. 5 (1965) 461-470. doi:10.1016/S0010-938X(65)80051-8.
Evans, "Behaviour of metals in nitric acid," T Faraday Soc. 40 (1944) 120-130. doi:10.1039/TF9444000120.
Farraj et al., "Self-Reduction of a Copper Complex MOD Ink for Inkjet Printing Conductive Patterns on Plastics." Chem Commun 2015, 51, 1587-1590.

(56) References Cited

OTHER PUBLICATIONS

Galwey et al., "Thermal decomposition of three crystalline modifications of anhydrous copper(ll) formate," J. Phys. Chem., 78, 2664 2670 (1974).

Griffith et al., "Multi-material processing by LENS," Solid Freeform Fabrication Proceedings. (1997) 387-394. doi:10.1.1.476.3973.

GSI Chemical Database http://gsi-net.com/en/publications/gsi-chemical-database/single/276.html (accessed Apr. 10, 2016).

Hannebauer et al., "18.9%-efficient screen-printed solar cells applying a print-on-print process," in Proc. 16th European Photovoltaic Solar Energy Conf, 2011, pp. 5-9.

Hermans et al., "Advanced Metallization Concepts By Inkjet Printing," in 29th European Photovoltaic Solar Energy Conference and Exhibition, 2014, pp. 518-522.

Hildreth et al., "Dissolvable Metal Supports for 3D Direct Metal Printing," 3D Printing and Additive Manufacturing. 3 (2016) 90-97. doi:10.1089/3dp.2016.0013.

Hock, "Inkjet Printing Gone Solar," R & D Magazine, Aug. 2015.

International Preliminary Report on Patentability for Application No. PCT/US2017/018084 dated Aug. 30, 2018 (9 pages).

International Preliminary Report on Patentability for Application No. PCT/US2017/018096 dated Aug. 30, 2018 (6 pages).

International Preliminary Report on Patentability for Application No. PCT/US2017/018104 dated Jan. 24, 2019 (9 pages).

International Search Report and Written Opinion for Application No. PCT/US2017/018084 dated Jun. 1, 2017, 10 pages.

International Search Report and Written Opinion for Application No. PCT/US2017/018096 dated May 15, 2017, 7 pages.

International Search Report and Written Opinion for Application No. PCT/US2017/018104 dated Jun. 1, 2017, 10 pages.

International Search Report and WrittenOpinion for Application No. PCT/US2018/33277 dated Aug. 8, 2018, 13 pages.

Jahn et al., "Inkjet printing of conductive silver patterns by using the first aqueous particle-free MOD ink without additional stabilizing ligands," Chem. Mater. 22, 3067-3071 (2010).

Jeffries et al., "Reactive silver ink as front contacts for high efficiency silicon heterojunction solar cells," 2016 IEEE 43rd Photovoltaic Specialists Conference (PVSC).

Johannes et al., "Letting Corrosion Work for You: Novel Pathways to Additive Manufacturing and Nanomaterial Synthesis Using Electrochemically-Driven Powder Consolidation," Advanced Engineering Materials. 16 (2014) 1147-1159. doi:10.1002/adem.201300562.

Kauffman et al., "Prediction of Surface Tension, Viscosity, and Thermal Conductivity for Common Organic Solvents Using Quantitative Structure—Property Relationships," J. Chem. Inf. Comput. Sci 41, 408-418 (2001).

Kikuchi et al., "Measurement of the adhesion of silver films to glass substrates," Thin Solid Films 124, 343-349 (1985).

Kim et al., "Investigation of the sensitization and intergranular corrosion of tube-to-tubesheet welds of hyper duplex stainless steel using an electrochemical reactivation method," Corrosion Science. 87 (2014) 60-70. doi:10.1016/j.corsci.2014.06.005.

Kim et al., "Nonlinear optical transitions of GaAs/AlGaAs GaAs/AlGaAs asymmetric double-well structures," Applied Physics Letters, 89, 1-3 (2006).

King et al., "Ultrasound Atomic Force Microscopy: Atomic-Scale Stability and Registration in Ambient Conditions," Nano Letters, Jan. 27, 2009, vol. 9, No. 4, 1451-1456, American Chemical Society 2009.

Kolman et al., "Corrosion of 304 stainless steel exposed to nitric acid-chloride environments," Corrosion Science. 39 (1997) 2067-2093. doi:10.1016/S0010-938X(97)00092-9.

Laleh et al., "Suppression of chromium depletion and sensitization in austenitic stainless steel by surface mechanical attrition treatment," Mater Lett. 65 (2011) 1935-1937 doi:10.1016/j.matlet.2011.03.055.

Lee et al., "A Novel Solution—Stamping Process for Preparation of a Highly Conductive Aluminum Thin Film. " Adv. Mater. 2011, 23, 5524-5528.

Lee et al., "Long-Term Sustainable Aluminum Precursor Solution for Highly Conductive Thin Films on Rigid and Flexible Substrates." ACS Appl. Mater. Interfaces 2014, 6, 15480-15487.

Lee et al., "Solution processed aluminum paper for flexible electronics," Langmuir 28, 13127-13135 (2012).

Lefky et al., "Dissolvable Supports in Powder Bed Fusion-Printed Stainless Steel," 3D Printing and Additive Manufacturing, vol. 4, No. 1, 2017.

Lefky et al., "Impact of Solvent Selection and Temperature on Porosity and Resistance of Printed Self-Reducing Silver Inks.," Phys. Status Solidi Appl. Mater. Sci., 2016, 1-8.

Li et al., "Conductive copper and nickel lines via reactive inkjet printing," J. Mater. Chem., vol. 19, No. 22, p. 3719, 2009.

Marinkovic, "Contact resistance effects in thin film solar cells and thin film transistors," Jacobs University Thesis, 2013.

McLachlan et al., "Electrical Resistivity of Composites," J. Am. Ceram. Soc., vol. 73, No. 8, pp. 2187-2203, Aug. 1990.

MEGlobal Ethylene Glycol Product Guide http://www.meglobal.biz/media/product_guides/MEGlobal_MEG.pdf (accessed Apr. 10, 2016).

Meier et al., "Contact resistance: Its measurement and relative importance to power loss in a solar cell," IEEE Trans. Electron Devices, vol. 31, No. 5, pp. 647-653, May 1984.

Meier et al., "Inkjetprinted, conductive, 25 uμm wide silver tracks on unstructured polyimide," Phys. Status Solidi Appl. Mater. Sci., vol. 206, No. 7, pp. 1626-1630, 2009.

Mo et al., "Effects of Dodecylamine and Dodecanethiol on the Conductive Properties of Nano-Ag Films." Appl Surf Sci 2011, 257, 5746-5753.

N. R. E. L. NREL, "Best Research-Cell Efficiencies," 2015.

Nie et al., "Inkjet printing of silver citrate conductive ink on PET substrate," Appl. Surf. Sci. 261, 554-560 (2012).

Ningshen et al., "Corrosion behaviour of AISI type 304L stainless steel in nitric acid media containing oxidizing species," Corrosion Science. 53 (2011) 64-70. doi:10.1016/j.corsci.2010.09.023.

Noor et al., "Corrosion Behavior of Mild Steel in Hydrochloric Acid Solutions," Int J Electrochem Sci 2008, 3, 806.

Perelaer et al., "Printed electronics: the challenges involved in printing devices, interconnects, and contacts based on inorganic materials," J. Mater. Chem. , vol. 20, No. 39, p. 8446, 2010.

Pysch et al., "A review and comparison of different methods to determine the series resistance of solar cells," Sol. Energy Mater. Sol. Cells, vol. 91, No. 18, pp. 1698-1706, 2007.

Rasigni et al., "Roughness spectrum and surface plasmons for surfaces of silver, copper, gold, and magnesium deposits," Phys. Rev. B, vol. 27, No. 2, pp. 819-830, Jan. 1983.

Rosen et al., "Printing a Self-Reducing Copper Precursor on 2D and 3D Objects to Yield Copper Patterns with 50% Copper's Bulk Conductivity," Adv. Mater. 2, 1440448 (2015).

Sastry et al., "Anodic Protection of Mild Steel in Nitric Acid," Corrosion. 39 (1983) 55-60. doi:10.5006/1.3580815.

Seikh et al., "Corrosion Behavior in 3.5% NaCl Solutions of γ-TiAl Processed by Electron Beam Melting Process," Metals 2015, vol. 5, pp. 2289-2302. 5 (2015) 2289-2302. doi:10.3390/met5042289.

Semi, "International Technology Roadmap for Photovoltaic 2015 Results," ITRPV, 2015.

Shanmugam et al., "Analysis of Fine-Line Screen and Stencil-Printed Metal Contacts for Silicon Wafer Solar Cells," IEEE J. Photovoltaics, vol. 5, No. 2, pp. 525-533, 2015.

Shapovalov, "Porous Metals.," MRS Bull., vol. 19, No. 04, pp. 24-28, Apr. 1994.

Shin et al., "A Self-Reducible and Alcohol-Soluble Copper-Based Metal—Organic Decomposition Ink for Printed Electronics," ACS Appl. Mater. Interfaces 6, 3312-3319 (2014).

Sinton et al., "A quasi-steady-state open-circuit voltage method for solar cell characterization," Proc. 16th Eur. Photovolt. Sol. Energy Conf, No. May, pp. 1-4, 2000.

Starr et al., "Controlling Phase Composition in Selective Laser Melted Stainless Steels," Power (W) 2012, 439.

Streicher et al., "Pitting Corrosion of 18Cr-8Ni Stainless Steel," J. Electrochem. Soc. 1956, 103, 375-390.

Stull, Vapor Pressure of Pure Substances. Organic and Inorganic Compounds. Ind. Eng. Chem. 1947, 39, 517-540.

(56) References Cited

OTHER PUBLICATIONS

Taguchi et al., "Obtaining a higherVoc in HIT cells," Prog. Photovoltaics Res. Appl., vol. 13, No. 6, pp. 481-488, Sep. 2005.
Talbot et al., "Control of the Particle Distribution in Inkjet Printing through an Evaporation-Driven Sol-Gel Transition," ACS Appl. Mater. Interf. 6, 9572-9583 (2014).
Talbot et al., "Evaporation of Picoliter Droplets on Surfaces with a Range of Wettabilities and Thermal Conductivities," Physical Review E, 2012, 85, 061604.
Tao et al., "A facile approach to a silver conductive ink with high performance for macroelectronics," Nanoscale Res. Lett., vol. 8, No. 1, pp. 1-6, 2013.
The Silver, Glistening Particles of Industrial Silver, https://www.Silverinstitute.orgsitewpcontentuploadsGPISDec.pdf accessed (Dec. 20, 2016).
Turpin et al., "Carbon diffusion and phase transformations during gas carburizing of high-alloyed stainless steels: Experimental study and theoretical modeling," Metall and Mat Trans A. 36 (2005) 2751-2760. doi:10.1007/s11661-005-0271-4.
Valeton et al., "Room temperature preparation of conductive silver features using spin-coating and inkjet printing ," J. Mater. Chem. 20, 543-546 (2010).
Vanýsek, "Impact of electrode geometry, depth of immersion, and size on impedance measurements," Canadian Journal of Chemistry, 1997, 75, 1635-1642.
Walker et al., "Reactive silver inks for patterning high-conductivity features at mild temperatures," J. Am. Chem. Soc., vol. 134, No. 3, pp. 1419-1421, 2012.
Wang et al., "Research on the fabricating quality optimization of the overhanging surface in SLM process," Int J Adv Manuf Technol. 65 (2013) 1471-1484. doi:10.1007/s00170-012-4271-4.
Wilke et al., Estimation of Diffusion Coefficients for Gases and Vapors. Ind. Eng. Chem. 1955, 47, 1253-1257.
Wolf et al., "Series resistance effects on solar cell measurements," Adv. Energy Convers., vol. 3, No. 2, pp. 455-479, 1963.
Zhang et al., "Reference and counter electrode positions affect electrochemical characterization of bioanodes in different bioelectrochemical systems," Biotechnology and Bioengineering 2014, 111(10): 1931-1939.
Disclosed Anonymously., "Dissolvable Metal-Polymer Composite Parts" [online], IP.com Prior Art Database Technical Disclosure, Apr. 2015 [obtained on Sep. 26, 2019 from ip.com], retrieved from the internet: <URL:file:///C:/Users/olarson/Downloads/IPCOM000241271D.pdf>.
Dinwiddie, R. et al., "Real-time process monitoring and temperature mapping of a 3D polymer printing process", SPIE Defense, Security, and Sensing (Baltimore, MD, May 22, 2013), 2013, vol. 8705, article 87050L, 10 pages <DOI:10.1117/12.1518454>.
Zenou, M. et al., "Printing of metallic 3D micro-objects by laser induced forward transfer", Optics Express, Jan. 2016, vol. 24, No. 2, pp. 1431-1446 <DOI:10.1364/OE.24.001431>.
Jones et al., Physical Properties of Ethylene Glycol—Google Scholar; Glycols. G. 0. Curme, 1952.
Topsoe, Semiconductor Division, Geometric Factors in Four Point Resistivity Measurement, 2nd edn. (1968). Available from download at Bridge Technology's web site, http://www.four-point-probes.com/haldor.html.
European Patent Office Extended Search Report for Application No. 17753793.3 dated Sep. 13, 2019 (8 pages).
International Preliminary Report on Patentability for Application No. PCT/US2018/033277 dated Nov. 28, 2019 (9 pages).
Office Action issued from the US Patent Office for related U.S. Appl. No. 15/998,839 dated Feb. 2, 2022 (13 Pages with the 892 form).

* cited by examiner

DISSOLVING METAL SUPPORTS IN 3D PRINTED METALS AND CERAMICS USING SENSITIZATION

RELATED APPLICATIONS

This application claims the benefit of U.S. Provisional Patent Application No. 62/363,034, filed Jul. 15, 2016, entitled "DISSOLVING METAL SUPPORTS IN 3D PRINTED METALS AND OXIDES USING SENSITIZATION," and U.S. Provisional Patent Application No. 62/400,464, filed Sep. 27, 2016, entitled "DIRECT SUPPORT DISSOLUTION FOR 3D PRINTED METALS AND OXIDES," the entire contents of both of which are incorporated herein by reference.

BACKGROUND

Additive Manufacturing (AM) of metal components can be classified by their binding method (sintering, melting, polymer adhesive), energy delivery method (laser, electron beam), and metal feed method (powder-bed, powder-fed, wire-fed). Metal components are commonly built using one of two methods; powder-bed fusion or directed-energy deposition. In powder-bed fusion, a laser or electron beam is scanned over a bed of metal powder to locally sinter or melt the powder, forming a slice of a part; building up multiple slices by adding another layer of metal powder to the "bed" produces a 3D metal object. In Directed-Energy Deposition (DED), metal powder(s) are blown or a wire is fed into a melt pool formed by a laser or electron beam. This added material increases the melt-pool and parts are built up in a layer-by-layer manner by moving the stage and energy/material deposition head relative to one another.

Both powder-bed and DED printing have advantages and disadvantages. Powder-bed systems can print complex parts with overhanging geometry with minimal post-print machining operations required. However, powder-bed systems are generally limited to printing a single material at a time. In contrast, the powder-fed DED printers can print multiple materials at a time, but parts with significant overhangs require extensive post-print machining operations to remove supports.

When the supports needed for many 3D metal printing processes must be machined off, this adds considerable expense (sometimes higher than the cost of the original part) such that it often pushes the cost of 3D printing higher than that of a traditional "subtractive" manufacturing process. Additionally, these supports inherently limit the size and complexity of the parts that can be fabricated using "monolithic" or single material printing. For example, in order to using 3D printing techniques for fabricate a frame for a car, the resulting frame would be designed in a way that is large, heavy, and geometrically awkward—making it extremely difficult to machine into final size and tolerance. The cost of a milling machine that size would be extremely high and manipulating the part into the machine with the necessary precision would be difficult and would likely require specialized tooling just for that part.

SUMMARY 3D printing of metals will have a significant impact on manufacturing around the world and have projected growth in the billions of dollars over the next few years. The systems and methods described herein dramatically simplify post-processing techniques for 3D metal printing without sacrificing part integrity. Additionally, these processing techniques open up new avenues for part geometries by eliminating the requirement that supports be accessible to machining operations.

This disclosure details a set of methods and chemistries for easy removal of supports or sections of a 3D printed metal structure by incorporating a mix of dissolvable (either chemically or electrochemically) microstructures/elements or mechanically weak microstructures/elements into the structure. This new process dramatically simplifies the support removal process for metals while also opening up new design freedoms by removing the restriction that the resulting support structures must be machine accessible—now they must be merely fluid accessible.

Support structures for most 3D printed metal/oxide are typically much thinner than the feature size of the printed component. For example, a typical support structure is 100-200 µm thick while the smallest feature on a print might be 2000 µm (2 mm) and the overall size of the component could be tens of centimeters. As a result, only a small amount of material relative to the component and its features needs to be dissolved in order to separate the supports from the component. As a result, supports can be chemically or electrochemically removed without machining operations and without impacting the final printed part.

For example, the corrosion resistance of many stainless steels requires sufficiently high chromium content (~>12 at. %) to ensure that a self-healing protective/passivating layer of chromium oxide forms. Diluting or trapping this chromium in sufficient quantities leaves the part/region chemically vulnerable to many etchants. This phenomenon is often seen in improperly performed welds where excess carbon binds with chromium to form chromium carbide precipitates at the grain boundary. This process, called sensitization, forms a depleted chromium region near the grain boundaries that may lead to intergranular corrosion. A similar phenomenon, known as leaching, occurs when welding stainless steel and carbon steel (or any other chromium deficient metal), where chromium diffusions from the stainless steel (where there is a high chromium concentration) to the carbon steel (where there is low chromium concentration). These leads to a chromium deficient region near the weld that is susceptible to chemical and/or electrochemical attach.

In various embodiments, the invention leverages existing capabilities 3D printers but in a way that eliminates or reduces the need for post-processing machining operations that are typically see in 3D printed metallic components. To date, there has been no incorporation of mechanically or chemically unstable sections into a 3D printed part specifically designed to be removed through chemical, electrochemical, mechanical processes for the purpose of support (or other structure) removal. This process dramatically simplifies post-processing and will enable new classes of designs and processes with at lower costs compared to existing systems. Additionally, this new process requires no change to existing 3D printing tools, is compatible with powder-bed 3D printers, and the equipment necessary to etch the supports is compatible with existing capital equipment.

As described in further detail in U.S. Provisional Patent Application Nos. 62/295,912 and 62/295,918, both filed Feb. 16, 2016, methods and chemistries can be implemented for removal of supports or sections of a 3D printed metal structure by incorporating chemically or electrochemically dissolvable elements into the structure. Because different metals can have different chemical stability levels to various etchants (for chemical dissolution) and different redox potentials (for electrochemical etchings), by incorporating small sections of a "dissolvable" metal or other material into a support structure, the resulting support structure can be chemically or electrochemically dissolved with little or no damage to the body of the component being fabricated. For example, a dissolvable support material of Ni could be used on a Ti component; Ni's lower redox (or standard) potential relative to Ti (Ti=+0.7 V, Ni=−0.26 V SHE) means that the Ni sections will oxidize and dissolve many orders of magnitude fater than the Ti part when coupled with an anode in an electrochemical etching bath set at a potential between Ti and Ni (e.g., ~0.1 V SHE). Under these types of conditions, the Ni will preferentially dissolve while the Ti will be left substantially unaltered. Similarly, support structures for a stainless steel component may be printed using carbon steel (e.g., chromium-deficient steel), which will be dissolved during an etching processes without substantially altering the stainless steel component.

In various embodiments described in this disclosure, an entire 3D printed piece—including a metal or ceramic component and one or more support structures—is created of a first metal or ceramic material. A sensitization layer is applied to all or part of the 3D printed piece to chemically alter portions of the first metal material near the surface making those portions of the material more sensitive to the etching process. The etching process causes the affected material to deplete and separates the component from the support structures without requiring mechanical machining to separate the component from the support structures.

In some embodiments, the geometry of the 3D printed piece is configured such that portions of the support structure that contact the component have a greater surface area and/or a smaller cross-sectional area relative to the component such that the sensitization layer chemically alters a greater proportion of the support structure at portions that contact the component. In some embodiments, the sensitization layer is applied to the entire surface area of the 3D printed piece while, in other embodiments, the sensitization layer is selectively applied primarily to portions of the support structure that contact the component.

In some embodiments, the sensitization process includes carburization, nitridation, or iron dilution/leeching. In some such embodiments, the 3D printed piece is created of stainless steel and an iron (Fe) alloy—such as, for example, iron formate, iron powder, or iron carbonyl—is applied as the sensitization layer to leech chromium from portions of the stainless steel 3D printed piece and to convert portions of the 3D printed piece from stainless steel into chromium deficient stainless steel or carbon steel. In other embodiments, the 3D printed piece is created of aluminum, copper or manganese (or other metals, sulfurs, or elements) is applied as the sensitization agent, and an acidic or basic solution is applied (with or without bias) to separate the support structure from the component. In still other embodiments, the 3D printed piece is created of titanium and sulfur (or one or more other elements) is applied as the sensitization agent.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
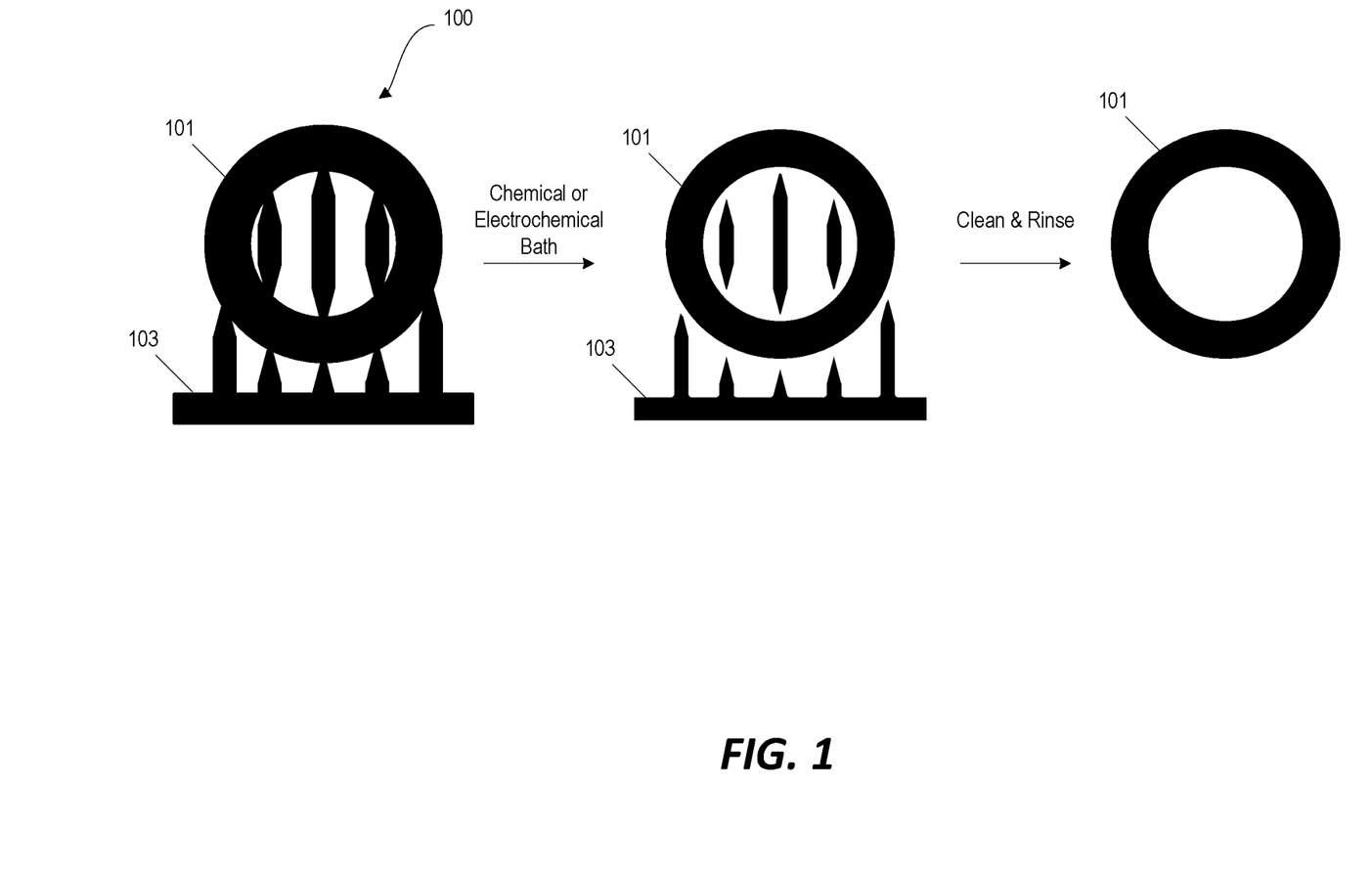
FIG. 1 is a schematic flowchart showing a 3D printed structure including a component and support structures and illustrating a method by which the component is separated from the support structures according to one embodiment.

FIG. 1 illustrates an example of a method for fabricating a metal or ceramic component using 3D printing techniques. A 3D printer is used to fabricate a 3D printed piece 100 from a metal or ceramic material (e.g., stainless steel, titanium, silicon carbide, etc.). The 3D printed piece 100 includes a body of a component 101 being fabricated and one or more support structures 103. The 3D printed piece 100 is placed in a chemical or electrochemical bath that dissolves all of the exposed surfaces of the 3D printed piece 100 until the body of the component 101 separates from the support structures 103. The body of the component 101 is then cleaned, rinsed, and, in some implementations, polished to remove any remaining pieces of the support structures 103.

Although not self-terminating, the process illustrated in the example of FIG. 1 does effectively separate the body of the component 101 from the support structures 103 without the need for machining processes. Furthermore, this process does result in partial dissolution of the body of the component 101 which must be accounted for when designing the dimensions and structure of the 3D printed piece 100. The structure of the 3D printed piece 100 can also be designed to reduce the amount of the body of the component 101 that will be dissolved before the body of the component 101 is separated from the support structures 103. For example, as illustrated in FIG. 1, the cross-sectional area of the support structure 103 tapers as it approaches the surface of the body of the component 101. Because the portion of the 3D printed piece 100 with the smallest cross-sectional area is the portion of the support structure 103 immediately in contact with the body of the component 101, this portion of the 3D printed piece 100 will be the first to completely dissolve through, thereby separating the body of the component 101 from the support structure 103.

In other implementations, other variations in the structural design of the 3D printed piece can be configured to control the dissolution process. For example, the 3D printed piece can be designed to include a spacer region between the body of the component 101 and the portion of the support structure 103 with the smallest cross-sectional area.

Figure 2:
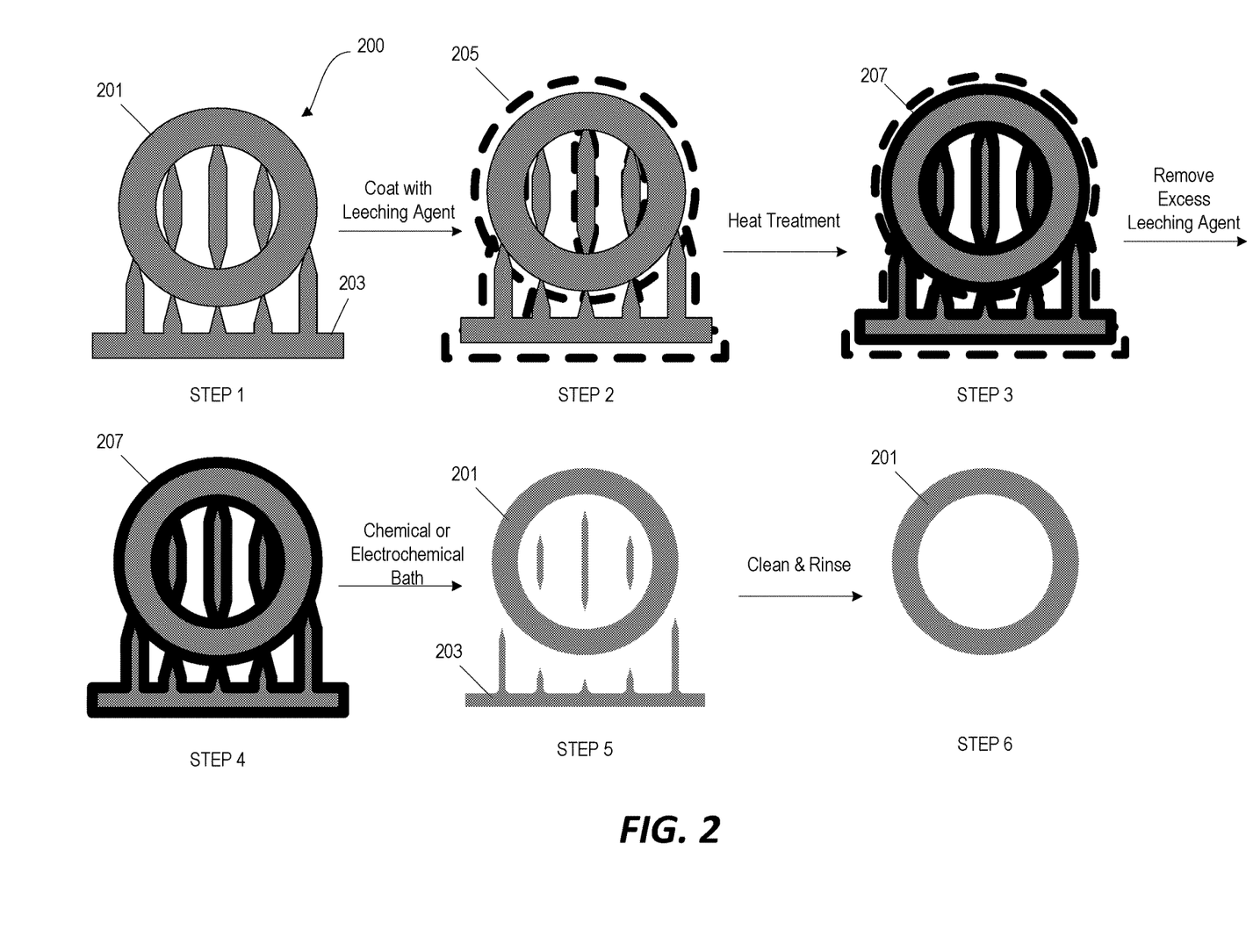
FIG. 2 is a schematic flowchart showing a 3D printed structure including a component and support structures and illustrating a method by which the component is separated from the support structures according to another embodiment.

In order to better regulate the degree to which the surface of the 3D printed piece will dissolve when placed in the chemical or electrochemical bath, all or part of the exterior of the 3D printed piece may be treated with a sensitization agent (e.g., a "leeching" agent). FIG. 2 illustrates an example of a method for fabricating a metal or ceramic component using 3D printing and a sensitization agent to regulate the dissolution of the 3D printed piece during separation of the component from the support structure.

In "Step 1," the 3D printed piece 200 is fabricated (i.e., printed) using a metal or ceramic material—in the example of FIG. 1, stainless steel—and includes both a body of the component 201 being fabricated and a plurality of support structures 203. In this example, the widths/cross-sectional area of the support structures gradually decreases at locations where the support structure 203 will contact the component 201. These are the areas at which the body of the component 201 will ultimately separate from the support structures 203.

In "Step 2," the entire surface of the 3D printed piece 200 is coated with a leeching agent 205 (shown in FIG. 2 as a dashed line). In this example, Fe Alloy is used as the leeching agent 205 for a 3D printed piece formed of stainless steel. However, in other implementations, other metal or ceramic materials can be used to print the 3D printed part and other materials can also be used as the leeching agent 205. Furthermore, although, in this example, the leeching agent 205 is applied to all surfaces of the 3D printed piece 200, in other implementations, only certain parts or regions of the 3D printed piece 200 are coated with the leeching agent to reduce the portions of the 3D printed piece 200 that are affected by the sensitization process. The leeching agent 205 can be applied as a slurry (i.e., particles in liquid), a liquid (e.g., iron carbonyl that decomposes iron and carbon monoxide under heat), chemical salt (solid, aqueous, or non-aqueous), chemical solution, or gas.

In "Step 3," heat treatment (or other treatment such as, for example, pressure treatment) is performed on the 3D printed piece 200 to trigger the leeching process. As shown in the example of FIG. 2, as heat treatment is performed, portions of the stainless steel material at or near surfaces of the 3D printed piece 200 that have been coated with the sensitization/leeching agent 205 are chemically altered and become chromium deficient stainless steel 207 (shown in FIG. 2 as a thick black line). In addition to "leeching" as illustrated in the example of FIG. 2, the surface areas of the 3D printed piece 200 can be degraded by mechanisms including, but not limited to, precipitate forming, grain boundary attach/weakening, intra-grain attach, dissolution, alloying, intermetallic alloying, and more. Similarly, in some implementations, the sensitization process can include carburization or nitridation.

After the heat treatment or other process is used to degrade the metal through sensitization, the leeching agent 205 is removed in "Step 4." However, in some implementations, the leeching agent 205 is removed as part of the heat treatment process (for example, when $O_2$ gas is used as a sensitization agent for carbon) or as part of the support dissolution process discussed below (for example, when nitric acid is used as a leeching agent for iron).

In "Step 5," the 3D printed piece 200 is placed in a chemical or electrochemical bath and the chemically altered portions of the 3D printed piece are dissolved by an etching process. In various implementations, the process to remove the weakened region of the 3D printed piece 200 (e.g., the portions of the 3D printed piece 200 with the chromium-depleted steel in the example of FIG. 2) may include, for example, chemical dissolution, electrochemical dissolution, thermal evaporation, thermal stressing, thermal cracking, stress corrosion cracking, mechanical strain, and mechanical deformation. As shown in the example of FIG. 2, removing the chromium-deficient steel after the sensitization process wears away the surfaces of the component 201 and the support structures 203 and, due to the geometry of the 3D printed piece 200, fully separates the component 201 from the support structures 203. In "Step 6," the separated component 201 is cleaned and rinsed and fabrication is complete.

By using the sensitization process to alter the chemical composition of the 3D printed structure 200, the support structures 203 can be completely removed from the component 201 chemically or electrochemically without any required machining. The sensitization and dissolution process also allows support structures 203 to be dissolved from areas that would be inaccessible to machining operations—therefore, the structure and geometry of the designed component 201 is less hindered by manufacturing constraints. The sensitization and dissolution process is also self-limiting in that the etching process will significantly halt when the depleted material (e.g., the chromium-deficient steel) is completely dissolved and only non-depleted stainless steel remains.

Figure 3A:
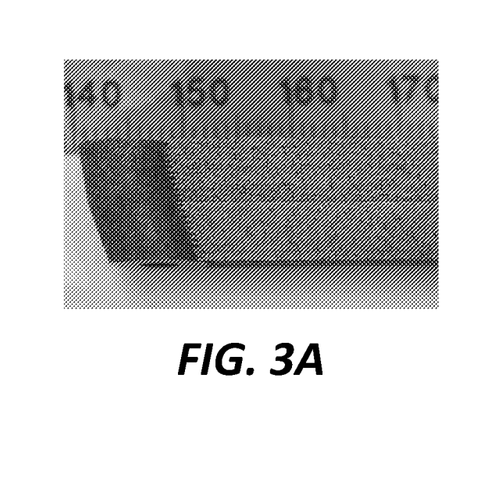
FIG. 3A is a perspective view of a 3D printed structure according to one embodiment.
Figure 3B:
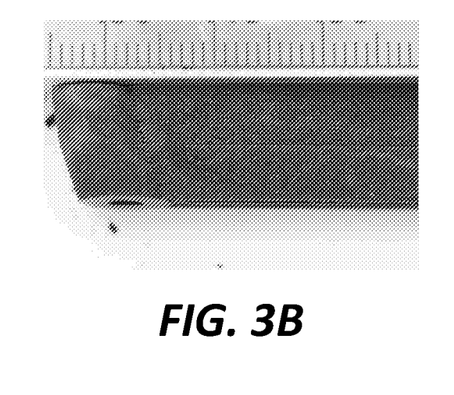
FIG. 3B is a perspective view of the 3D printed structure of FIG. 2A after sensitization.

FIGS. 3A through 3F illustrate another, more specific example of the sensitization and dissolution process for removing support structures from a fabricated component. FIG. 3A shows the 3D printed structure. This PH 17-4 sample is produced using an EOS M280 PBF system and built using the OEM's standard parameters for PH 17-4. The sample specimen of FIG. 3A was cut from a tubular arch and the support structures are formed connecting to the component at fine points less than 100 μm in size. The sample was sonicated in acetone, then isopropyl alcohol, and finally dried using N2 gas. Next, samples was dipped in a saturated solution of sodium ferrocyanide decahydrate ($Na_4Fe(CN)_6 10H2O$, Sigma Aldrich, ≥99%) allowed to air-dry, and placed on stainless steel tool wrap. A sodium ferrocyanide paste ($Na4Fe(CN)6.10H_2O$ and DI $H_2O$) was packed around the part and the tool wrap was folded and sealed around the part. A small hole was punctured into the stainless steel wrap to outgas the ~0.25 moles of CN and $H_2O$ vapor that could be produced as the sodium ferrocyanide decahydrate decomposes. Samples were then place into an exhausted box furnace at 800° C. for six hours and allowed to cool to room temperature overnight in the oven. FIG. 3B shows the sample after it was removed from the foil and excess decomposition products were removed using stainless steel bristle brush followed by sonication in DI $H_2O$ and isopropyl alcohol.

After the sensitization and heat-treating process, an electrolyte of 3 wt. % nitric acid with 0.1 molar KCl was made by mixing 70 wt. % nitric acid with DI $H_2O$, and KCl. A Pine Research Instruments WaveNow USB Potentiostat/Galvanostat was used to measure the Open-Circuit Potential (OPC), gather potentiodynamic polarization curves, and apply constant bias for electrochemical dissolution of the mixed stainless steel/carbon steel part. OPC and potentiodynamic curves where gathered from the untreated part, treated part, and post-etched component to identify the corrosion potential and potential to selectively etch the sensitized surface without etching the component. The sample was etched at −350 mVSHE until the component separated from the part. The sample was removed every sixty minutes for optical imaging. After eight hours, the build-up of black powder (presumably magnetite, Fe3O4) within the supports was removed using a steel wire brush and the sample was etched for three more hours until the component separated from the supports.

Figure 3C:
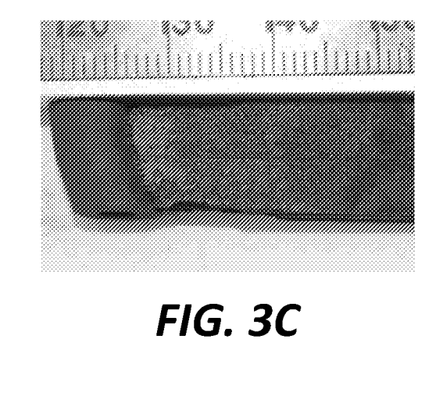
FIGS. 3C through 3F are further perspective views of the 3D printed structure of FIG. 3A as the component is separated from the support structures by a chemical (or electrochemical) etching process.
Figure 3D:
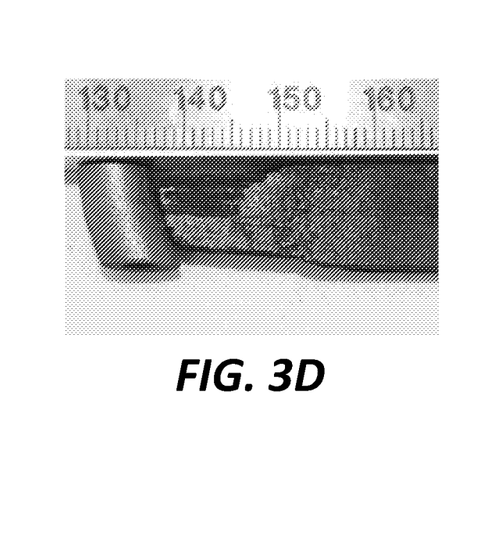
Figure 3E:
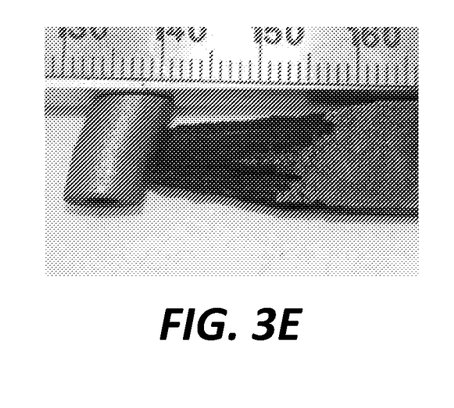
Figure 3F:
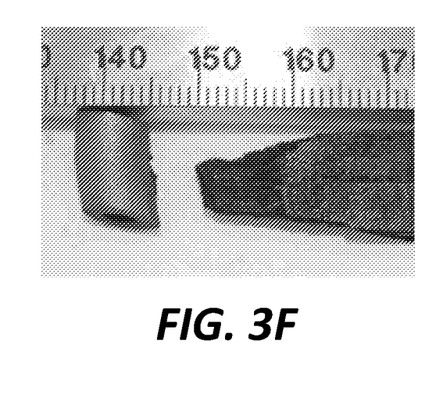

FIG. 3C shows the sample after eight hours of etching with no brushing. Notice that the component still appears dark in color, indicating that the carburized layer has not been fully removed. Additionally, only a small percentage of the supports have been removed by this time. Brushing and sonicating the sample to remove precipitate buildup increases the etch rate significantly. FIGS. 3D, 3E, and 3F show the sample after 9 hours, 10 hours, and 11 hours of etching, respectively. Notice that after nine hours of etching (as shown in FIG. 3D), the tubular component appears bright and shiny while the support structure is still dark and black. This indicates that the etching has reached the underlying stainless steel of the component. The diameter of the tubular component did not decrease or change with further exposure to the etching environment as shown in FIGS. 3E and 2F. Because the etching process does not significantly affect the component after the stainless steel is exposed, the process is self-limiting and can be conducted without overly-detailed monitoring.

Although some of the examples discussed above may refer to a specific type of metal or metal materials generally, in various implementations, the methods and systems discussed above may be adapted to utilize other materials for the 3D printed supports and/or components, for the sensitization process, and for the chemical/electrochemical dissolution process. For example, as discussed above, the 3D printed piece may be formed of a ceramic or oxide material and both the sensitization material and the dissolution process will be selected and configured based on the type of ceramic or oxide material used in the 3D printing process. Similarly, in still other implementations, the systems and methods discussed above may be adapted to separating a 3D printed component from support structures (or other structures) using sensitization and chemical/electrochemical dissolution processes while printing with still other materials including, for example, polymer materials.

Thus, the invention provides, among other things, a method for fabricating a metal component using 3D printing by using sensitization to facilitate separation of the metal component from support structures. Various features and advantages of the invention are set forth in the following claims.

What is claimed is:

1. A method of fabricating a metal or ceramic component using 3D printing, the method comprising:
    creating a 3D printed piece constructed of a first metal or ceramic material and including a body of the metal or ceramic component coupled to one or more support structures;
    applying a sensitization agent to surfaces of the 3D printed piece, wherein the sensitization agent alters a chemical composition of the first metal or ceramic material into a second metal or ceramic material at the surfaces of the 3D printed piece where the sensitization agent was applied such that, after reacting with the sensitization agent, the first metal or ceramic material of the metal or ceramic piece is at least partially covered by the second metal or ceramic material;
    separating the body of the metal or ceramic component from the one or more support structures by applying a chemical or electrochemical dissolution process that dissolves the second metal or ceramic material without significantly affecting the first metal or ceramic material; and
    applying a heat treatment process to the 3D printed piece after applying the sensitization agent to facilitate a reaction between the first metal or ceramic material and the sensitization agent that partially converts the first metal or ceramic material to the second metal or ceramic material.

2. The method of claim 1, wherein creating the 3D printed piece includes creating a 3D printed piece where a portion of the one or more support structures that contacts the body of the metal or ceramic component has a smaller cross-sectional area relative to the body of the metal or ceramic component.

3. The method of claim 1, wherein a reaction between the first metal or ceramic material and the sensitization agent that partially converts the first metal or ceramic material to the second metal or ceramic material includes a reaction selected from a group consisting of carburization, nitridation, and leeching.

4. The method of claim 1, wherein the first metal or ceramic material includes stainless steel, the second metal or ceramic material includes chromium deficient stainless steel, and the sensitization agent includes an iron alloy.

5. The method of claim 1, wherein applying the sensitization agent to the surfaces of the 3D printed piece includes applying the sensitization agent to surfaces of the body of the metal or ceramic component and surfaces of a sacrificial interface region coupling the body of the metal or ceramic component to the one or more support structures, wherein applying the sensitization agent to the surfaces of the body of the metal or ceramic component alters the chemical composition of the first metal or ceramic material into the second metal or ceramic material at the surfaces of the body of the metal or ceramic component, and wherein applying the chemical or electrochemical dissolution process includes at least partially dissolving portions of the second metal or ceramic material at the surfaces of the body of the metal or ceramic component.

6. The method of claim 5, wherein creating the 3D printed piece includes creating the sacrificial interface region with a cross-sectional area smaller than the cross-sectional area of the body of the metal or ceramic component so that, after applying the sensitization agent to surfaces of the 3D printed piece, a greater proportion of the cross-sectional area of the sacrificial interface region is formed of the second metal or ceramic material compared to the cross-sectional area of the body of the metal or ceramic component, and wherein applying the chemical or electrochemical dissolution process includes dissolving the second metal or ceramic material at a rate so that the body of the metal or ceramic component is separated from the one or more support structures before the body of the metal or ceramic component itself is dissolved.

7. The method of claim 1, further comprising applying an additive to the 3D printed piece, wherein the additive protects the first metal or ceramic material from the chemical or electrochemical dissolution process.

8. The method of claim 1, further comprising applying an additive to the 3D printed piece, wherein the additive makes the second metal or ceramic material more susceptible to the chemical or electrochemical dissolution process.

9. The method of claim 1, wherein applying the sensitization agent to surfaces of the 3D printed piece includes applying the sensitization agent only to surfaces of the 3D printed piece at a sacrificial interface region, wherein the sacrificial interface region is separated from the body of the metal or ceramic component by a spacer region, and further comprising applying a machining or polishing process to remove the spacer region from the body of the metal or ceramic component after separating the body of the metal or ceramic component from the support structure.

10. The method of claim 1, wherein creating the 3D printed piece includes
creating a sacrificial interface region with a smaller cross-sectional area than a cross-sectional area of the body of the metal or ceramic component, and
creating a spacer region between the body of the metal or ceramic component and the sacrificial interface region, wherein a cross-sectional area of the spacer region is larger than the cross-sectional area of the sacrificial interface region such that application of the chemical or electrochemical dissolution process causes the body of the metal or ceramic component to separate from the one or more support structures at the sacrificial interface region before completely dissolving the spacer region, and
the method further comprising applying a machining or polishing process to remove a remaining portion of the spacer region from the body of the metal or ceramic component after separating the body of the metal or ceramic component from the support structure.

11. A method of fabricating a metal or ceramic component using 3D printing, the method comprising:
creating a 3D printed piece constructed of a first metal or ceramic material and including a body of the metal or ceramic component coupled to one or more support structures;
applying a sensitization agent to surfaces of the 3D printed piece, wherein the sensitization agent alters a chemical composition of the first metal or ceramic material into a second metal or ceramic material at the surfaces of the 3D printed piece where the sensitization agent was applied such that, after reacting with the sensitization agent, the first metal or ceramic material of the metal or ceramic piece is at least partially covered by the second metal or ceramic material; and
separating the body of the metal or ceramic component from the one or more support structures by applying a chemical or electrochemical dissolution process that dissolves the second metal or ceramic material without significantly affecting the first metal or ceramic material,
wherein a reaction between the first metal or ceramic material and the sensitization agent that partially converts the first metal or ceramic material to the second metal or ceramic material includes a reaction selected from a group consisting of carburization, nitridation, and leeching.

12. The method of claim 11, further comprising applying an additive to the 3D printed piece, wherein the additive protects the first metal or ceramic material from the chemical or electrochemical dissolution process or makes the second metal or ceramic material more susceptible to the chemical or electrochemical dissolution process.

13. The method of claim 11, wherein creating the 3D printed piece includes creating a 3D printed piece where a portion of the one or more support structures that contacts the body of the metal or ceramic component has a smaller cross-sectional area relative to the body of the metal or ceramic component.

14. A method of fabricating a metal or ceramic component using 3D printing, the method comprising:
creating a 3D printed piece constructed of a first metal or ceramic material and including a body of the metal or ceramic component coupled to one or more support structures;
applying a sensitization agent to surfaces of the 3D printed piece, wherein the sensitization agent alters a chemical composition of the first metal or ceramic material into a second metal or ceramic material at the surfaces of the 3D printed piece where the sensitization agent was applied such that, after reacting with the sensitization agent, the first metal or ceramic material of the metal or ceramic piece is at least partially covered by the second metal or ceramic material; and
separating the body of the metal or ceramic component from the one or more support structures by applying a chemical or electrochemical dissolution process that dissolves the second metal or ceramic material without significantly affecting the first metal or ceramic material;
wherein applying the sensitization agent to the surfaces of the 3D printed piece includes applying the sensitization agent to surfaces of the body of the metal or ceramic component and surfaces of a sacrificial interface region coupling the body of the metal or ceramic component to the one or more support structures, wherein applying the sensitization agent to the surfaces of the body of the metal or ceramic component alters the chemical composition of the first metal or ceramic material into the second metal or ceramic material at the surfaces of the body of the metal or ceramic component, and wherein applying the chemical or electrochemical dissolution process includes at least partially dissolving portions of the second metal or ceramic material at the surfaces of the body of the metal or ceramic component.

15. The method of claim 14, wherein creating the 3D printed piece includes creating the sacrificial interface region with a cross-sectional area smaller than the cross-sectional area of the body of the metal or ceramic component so that, after applying the sensitization agent to surfaces of the 3D printed piece, a greater proportion of the cross-sectional area of the sacrificial interface region is formed of the second metal or ceramic material compared to the cross-sectional area of the body of the metal or ceramic component, and wherein applying the chemical or electrochemical dissolution process includes dissolving the second metal or ceramic material at a rate so that the body of the metal or ceramic component is separated from the one or more support structures before the body of the metal or ceramic component itself is dissolved.

16. The method of claim 14, further comprising applying an additive to the 3D printed piece, wherein the additive protects the first metal or ceramic material from the chemical or electrochemical dissolution process or makes the second metal or ceramic material more susceptible to the chemical or electrochemical dissolution process.

17. The method of claim 14, wherein creating the 3D printed piece includes creating a 3D printed piece where a portion of the one or more support structures that contacts the body of the metal or ceramic component has a smaller cross-sectional area relative to the body of the metal or ceramic component.

18. A method of fabricating a metal or ceramic component using 3D printing, the method comprising:
creating a 3D printed piece constructed of a first metal or ceramic material and including a body of the metal or ceramic component coupled to one or more support structures;
applying a sensitization agent to surfaces of the 3D printed piece, wherein the sensitization agent alters a chemical composition of the first metal or ceramic material into a second metal or ceramic material at the surfaces of the 3D printed piece where the sensitization agent was applied such that, after reacting with the sensitization agent, the first metal or ceramic material of the metal or ceramic piece is at least partially covered by the second metal or ceramic material; and separating the body of the metal or ceramic component from the one or more support structures by applying a chemical or electrochemical dissolution process that dissolves the second metal or ceramic material without significantly affecting the first metal or ceramic material;

wherein applying the sensitization agent to surfaces of the 3D printed piece includes applying the sensitization agent only to surfaces of the 3D printed piece at a sacrificial interface region, wherein the sacrificial interface region is separated from the body of the metal or ceramic component by a spacer region, and further comprising applying a machining or polishing process to remove the spacer region from the body of the metal or ceramic component after separating the body of the metal or ceramic component from the support structure.

19. The method of claim 18, further comprising applying an additive to the 3D printed piece, wherein the additive protects the first metal or ceramic material from the chemical or electrochemical dissolution process or makes the second metal or ceramic material more susceptible to the chemical or electrochemical dissolution process.

20. The method of claim 18, wherein creating the 3D printed piece includes creating a 3D printed piece where a portion of the one or more support structures that contacts the body of the metal or ceramic component has a smaller cross-sectional area relative to the body of the metal or ceramic component.

* * * * *